United States Patent [19]

McKinnon

[11] Patent Number: 4,966,397
[45] Date of Patent: Oct. 30, 1990

[54] FLEXIBLE PIPE SADDLE

[76] Inventor: Robert M. McKinnon, P.O. Box 648, Bedford, Tex. 76021-0648

[21] Appl. No.: 401,990

[22] Filed: Sep. 1, 1989

[51] Int. Cl.$^5$ .............................................. F16L 5/00
[52] U.S. Cl. .................................... 285/197; 285/423
[58] Field of Search ................ 285/197, 198, 199, 423

[56] References Cited

U.S. PATENT DOCUMENTS

| | | | |
|---|---|---|---|
| 3,188,121 | 6/1965 | Cude et al. | 285/197 |
| 3,432,188 | 3/1969 | Turner | 285/197 |
| 3,540,759 | 11/1970 | Schneider | 285/423 X |
| 3,649,055 | 3/1972 | Nilsen | 285/197 |
| 3,825,286 | 7/1974 | Henry | 285/197 X |
| 3,843,169 | 10/1974 | Wise | 285/423 X |
| 3,891,247 | 6/1975 | Smith | 285/423 X |
| 4,494,780 | 1/1985 | Burnett | 285/199 X |
| 4,606,558 | 8/1986 | Davidson | 285/21 |

*Primary Examiner*—Dave W. Arola
*Attorney, Agent, or Firm*—Arthur F. Zobal

[57] ABSTRACT

A flexible saddle device provides a leak-proof tap into pipes of various sizes. The saddle device, which is made of a flexible elastomeric material, has a fitting portion for receiving the end of a branch pipe and a coupling portion for coupling onto a main pipe. The coupling portion includes an arcuate wall that can be flexed to accommodate the outside diameters of various sized pipes. The coupling portion has circumferential edge portions which extend circumferentially on the main pipe and longitudinal edge portions which extend longitudinally on the main pipe. The longitudinal edge portions each have a stiffener, which is made of a relatively stiff material, and a lip that projects inwardly from the inner surface of the coupling portion. The stiffeners extend between the circumferential edge portions and resist outward bowing when the coupling portion is flexed to fit onto a pipe that is of a smaller radius than the unflexed coupling portion. The lips, in conjunction with the stiffeners, provide a seal along the longitudinal edge portions.

20 Claims, 3 Drawing Sheets

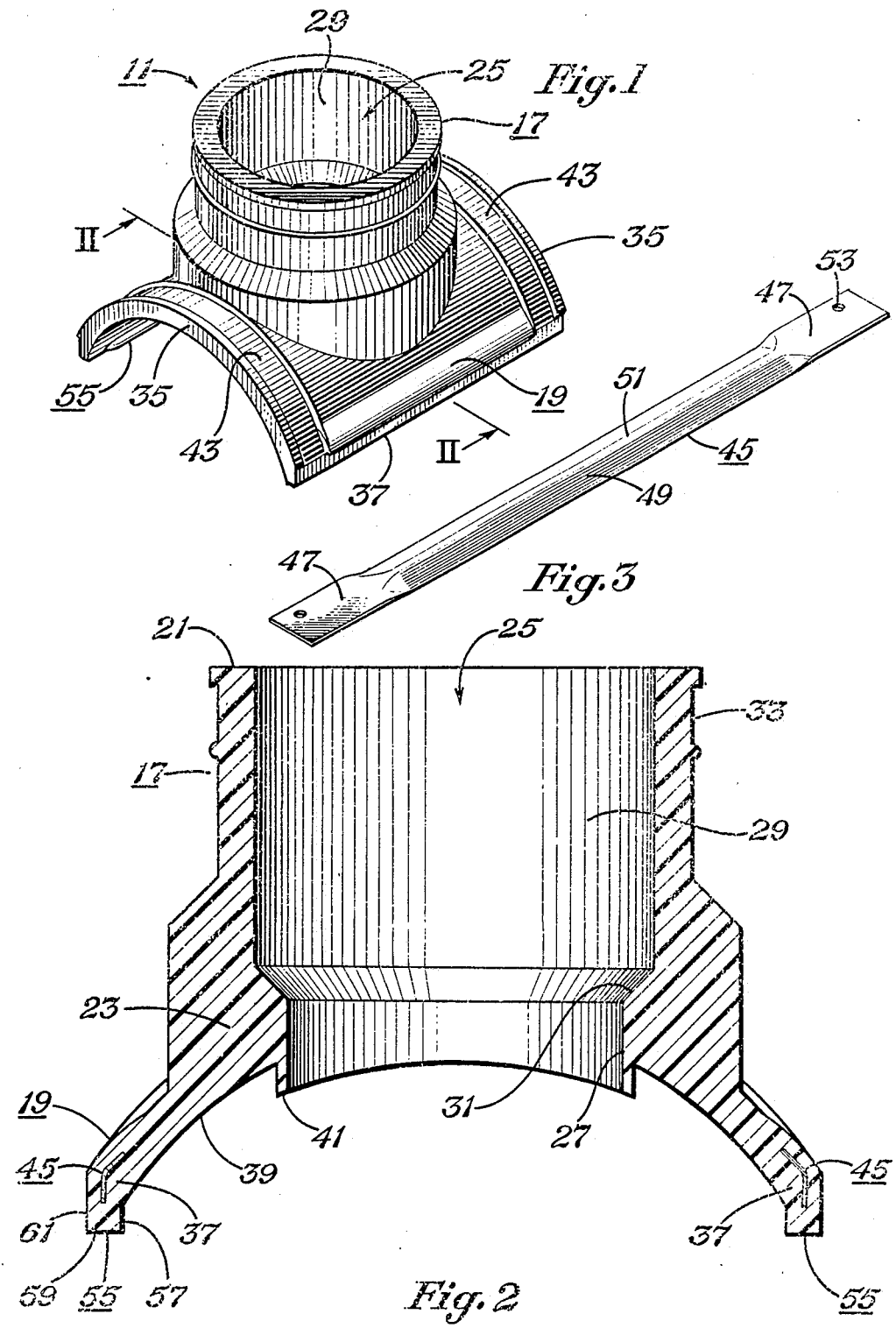

FLEXIBLE PIPE SADDLE

FIELD OF THE INVENTION

The present invention relates to saddle devices for use in tapping into pipes.

BACKGROUND OF THE INVENTION

A sewer collection system includes a main pipe and tributary branch pipes which connect into the main pipe at locations along its length. Frequently, it is desired to tap into the main sewer pipe to provide a new branch pipe. Saddle devices are used to provide leak free taps into a main pipe. The saddle device, which is located around the outside diameter of the main pipe, includes a fitting portion for receiving the new branch pipe and a coupling portion for coupling onto the main pipe.

Sewer mains come in a variety of sizes (e.g. 4-12 inches and even larger). Because of the diversity of sewer main pipe sizes it is desirable to have a saddle device that can fit more than one main pipe size. Such a saddle device would reduce the need for large inventories necessitated by prior art saddles.

SUMMARY OF THE INVENTION

It is an object of the present invention to provide a saddle device that provides a leak-proof tap on a pipe, which saddle device can fit a variety of tapped pipe sizes.

The saddle device includes a fitting portion and a coupling portion. The fitting portion has an outer end and an inner end. There is a passage that extends between the outer and inner ends. The outer end is adapted to receive a second pipe. The coupling portion is integral to the fitting portion inner end. The coupling portion has an arcuate inner surface for contacting the outside diameter of a first pipe. The inner surface has an opening that communicates with the passage of the fitting portion. The coupling portion has a circumferential edge portion on each side of the fitting portion and a connecting edge portion on each side of the fitting portion. The circumferential edge portions have a curvature that is similar to the inner surface curvature and are adapted to fit around part of the circumference of the first pipe. The circumferential edge portions are adapted to receive means for retaining the saddle device onto the first pipe. The connecting edge portions extend between the circumferential edge portions. The saddle device is made of an elastomeric material so as to be flexible, wherein the coupling portion can be flexed so as to both increase or decrease the curvature of the inner surface so that the saddle device can be fitted onto a variety of pipe sizes. The connecting portions have respective stiffening means extending between the circumferential edge portions. The stiffening means are made of a material that is stiffer than the elastomeric material so as to inhibit bowing of the connecting portions when the curvature of the inner surface is increased.

In another aspect, each of the connecting edge portions includes an integral lip means that projects inwardly from the inner surface so as to contact the first pipe when the saddle device is installed onto the first pipe. In still another aspect, each of the stiffening means includes a metal strip imbedded inside the respective connecting edge portion. In still another aspect, the metal strip has a "V" shaped transverse cross-section.

The saddle device is made of a flexible elastomeric material that both allows the flexure of the connecting portion to fit a variety of pipe sizes and provides sealing contact with the outside diameter of the first pipe along the circumferential and connecting edge portions. Sealing contact is provided by the inner surface along the circumferential edge portions by retaining means that encircle the first pipe. Sealing contact is provided by the inner surface along the connecting edge portions. Stiffening means prevent outward bowing of the connecting edge portions and maintains sealing contact. Such a tendency of outward bowing occurs when the curvature of the inner surface is increased so as to fit the saddle device onto a smaller first pipe. The lip means enhances the sealing contact along the connecting edge portions.

BRIEF DESCRIPTION OF THE DRAWINGS

FIG. 1 is an isometric view of the saddle device of the present invention, in accordance with a preferred embodiment.

FIG. 2 is a cross-sectional view of the saddle device taken along lines II—II of FIG. 1.

FIG. 3 is an isometric view of one of the metal stiffeners.

DESCRIPTION OF PREFERRED EMBODIMENT

Figure 7:
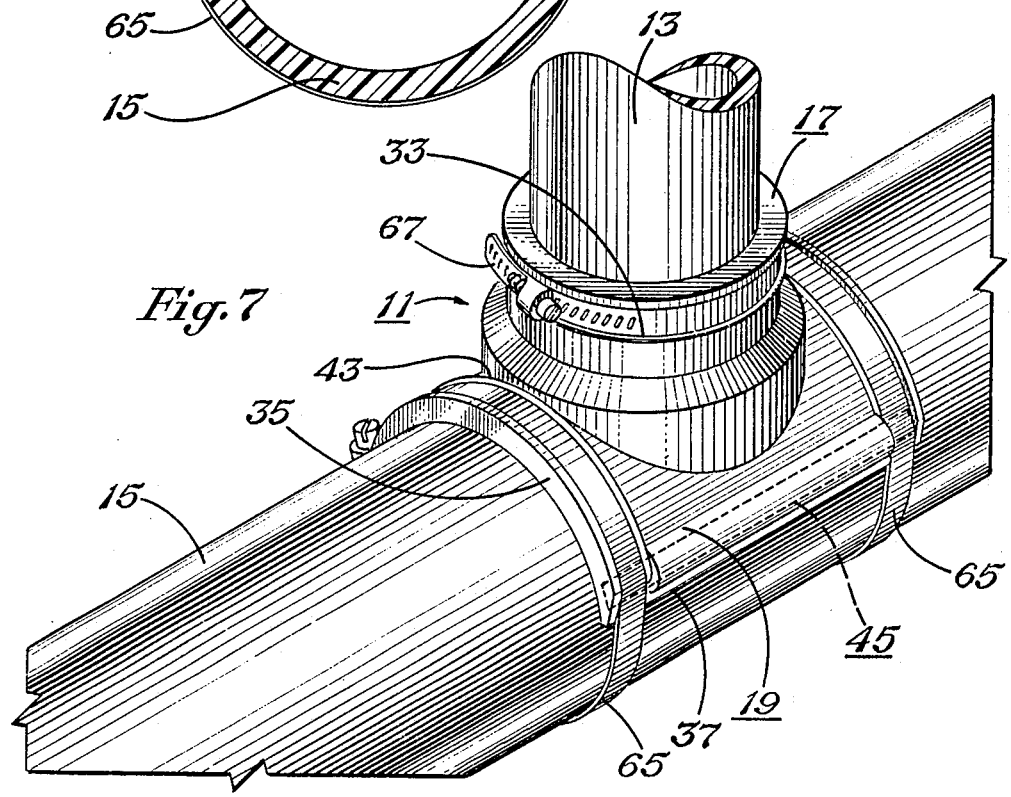
FIG. 7 is an isometric view of the saddle device installed onto main and branch pipes.

In FIGS. 1 and 7, there are shown isometric views of the saddle device 11 of the present invention, in accordance with a preferred embodiment. The saddle device 11 is used to tap a branch pipe 13 into a main pipe 15. The branch pipe 13 is typically of a smaller diameter than the main pipe 15, although this need not always be the case. The saddle device provides a leakproof joint between the branch pipe and the main pipe.

Referring to FIGS. 1 and 2, the saddle device 11 includes a fitting portion 17 and a coupling portion 19.

Figure 4:
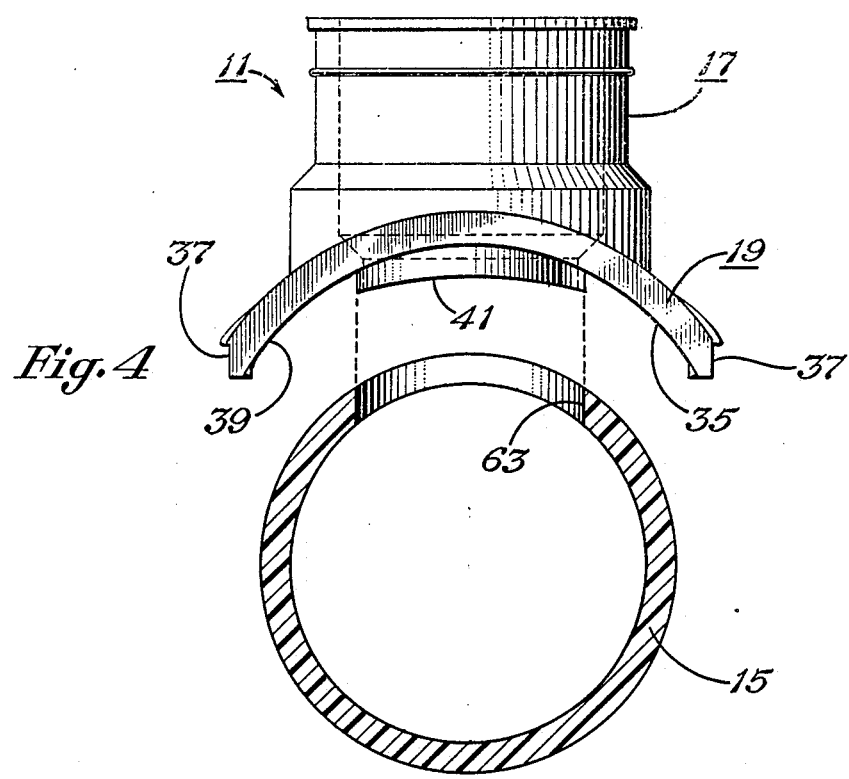
FIGS. 4-6 are end views of the saddle device showing various steps in its installation onto a main pipe having a radius that is smaller than the normal or unflexed radius of the inner surface of the saddle device.
Figure 5:
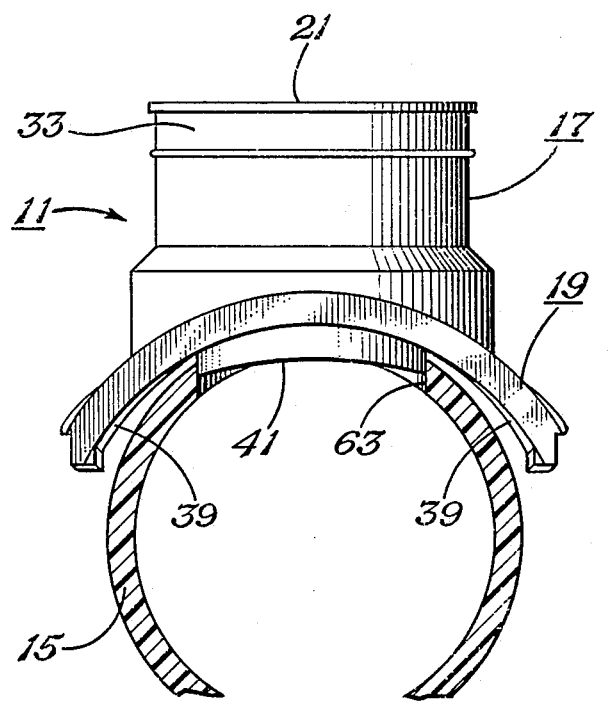
Figure 6:
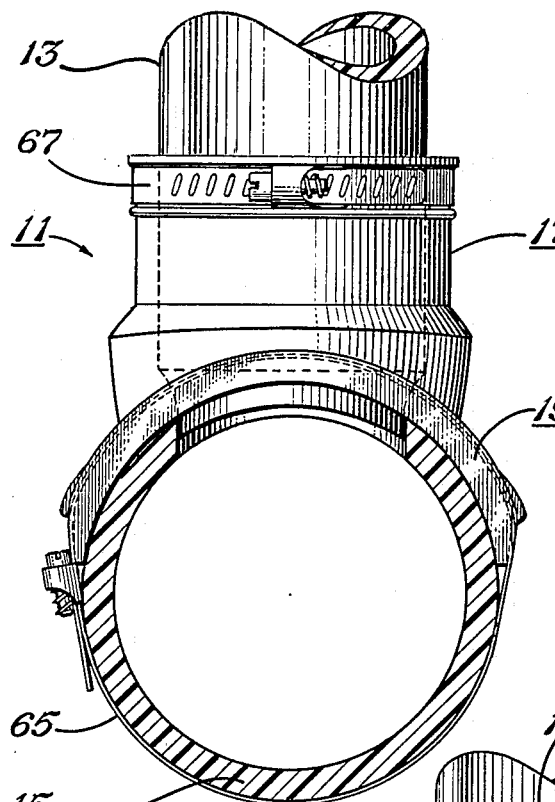

The fitting portion 17 receives the end of the branch pipe 13 (see FIGS. 6 and 7). The fitting portion 17 is generally cylindrical, having an outer end 21 and an inner end 23. The fitting portion 17 has a passage 25 that extends between the outer and inner ends. The passage 25 is formed by a cylindrical central bore 27 extending through the coupling portion and a larger diameter cylindrical counterbore 29, extending from the bore 27 to the outer end 21 of the fitting portion 17. A beveled surface 31 merges the cylindrical bore 27 with the counterbore 29. The outer end of the cylindrical counterbore 29 matingly receives the end portion of the branch pipe 13. The fitting portion 17 has, at its outer end 21, a circumferential channel 33 for receiving a retaining clamp 67.

The coupling portion 19 is placed on the outside diameter of the main pipe 15 and couples the fitting portion 17 to the main pipe 15. The coupling portion 19 is an arcuate wall that extends from the inner end 23 of the fitting portion 17 such that the fitting portion is in the center of the coupling portion. The coupling portion 19 has two circumferential edge portions 35 and two longitudinal edge portions 37. The circumferential edge portions 35 extend around part of the circumference of the main pipe 15. The longitudinal edge portions 37 extend between the circumferential edge portions 35 so as to connect the end of one circumferential edge portion with the end of the other circumferential edge portion. The coupling portion 19 also has a smooth inner surface 39 that is substantially cylindrically curved so as to fit onto the outside diameter of the main pipe 15. Because of the curvature of the inner surface 39, the circumferential edge portions 35 are arcuate, while the longitudinal edge portions 37 are straight. The central bore 27 extends through the inner surface 39. A locator ring 41, or lip, projects from the inner surface 39. The locator ring 41 provides an extension of the central bore 27 beyond the inner surface 39. The outer surface portions of the circumferential edge portions 35 have channels 43 for receiving retaining clamps 65.

The longitudinal edge portions 37 of the coupling portion 19 have molded therein stiffeners 45 (see FIGS. 2 and 3). Each stiffener 45 is an elongated metal strip, having flat end portions 47. The central portion 49 of each stiffener is bent so as to form a shallow "V", when viewed in transverse cross-section; the resulting crease 51 extends longitudinally. In the preferred embodiment, the flat end portions 47 have openings 53, which are used during the manufacture of the saddle device 11 to locate the stiffeners 45 within the mold. In the preferred embodiment, a stiffener 45 is molded within each longitudinal edge portion 37 of the coupling portion 19. The stiffeners 45 extend between the two circumferential edge portions 35, wherein the flat end portions 47 are located beneath the retaining clamp channels 43.

Each longitudinal edge portion 37 has a lip 55 formed along its edge, which lip inclines inwardly (towards the main pipe when the saddle device is installed onto the main pipe) from the inner surface 39. In the preferred embodiment, each lip 55 has an inside surface 57 and a lower surface 59. Each longitudinal edge portion has a side surface 61. The inside surface 57 forms a ninety degree angle with the lower surface 59, which forms a ninety degree angle with the side surface 61. The inside surface 57 of the lip 55 merges with the coupling portion inside surface 39 at an obtuse angle.

The coupling portion 19 is integral to the fitting portion 17. At the inner end portion 23 of the fitting portion 17, the wall is thickened to provide reinforcement in supporting the weight of the branch pipe.

The saddle device 11 of the present invention is made of an elastomeric material. In the preferred embodiment, the saddle device 11 is made of flexible polyvinyl chloride (PVC) such as type II, or plasticized, PVC. A typical plasticizer that may be used is dioctylphthalate. In addition, the saddle device can be made of either flexible polyurethane or natural rubber. An example of a flexible polyurethane are the polyurethane diisocyanate elastomers, which are commonly referred to as urethane rubber. These elastomers are made with various isocyanates, such as tolylene diisocyanate, 4,4'-diphenylmethane diisocyanate, or 1,5 naphthalene diisocynanate. The flexibility of the elastomeric material allows the saddle device to be fitted onto a variety of main pipe sizes. The coupling portion 19 can be flexed to fit the curvature of the particular main pipe size which is to be tapped. For example, in the preferred embodiment, the inner surface of the coupling portion is sized to fit a six inch main pipe when in the unflexed condition. However, the saddle device can be installed on main pipes larger than six inches by spreading or flexing the lips 55 further apart with respect to each other (or, in other words, by increasing the radius of the inner surface 39). The saddle device can also be installed on main pipes smaller than six inches by pushing or flexing the lips 55 closer together with respect to each other (or, in other words, by decreasing the radius of the inner surface 39). The metal strip 45 is made of 18 gauge cold rolled steel.

In the preferred embodiment, the saddle device 11 is molded in accordance with conventional molding techniques. The inner surface 39 is molded with a curvature that will fit a medium sized pipe, wherein the coupling portion can be flexed to fit on larger or smaller pipes. The stiffeners 45 are located in the mold by pins (not shown), which are received by the respective openings 53 in the flat ends 47. The stiffeners 45 are oriented to resist bowing of the longitudinal edge portions 37 in the outward direction.

The installation and use of the saddle device 11 of the present invention will now be described, with reference to FIGS. 4–7. A circular hole 63 is first cut into the main pipe 15 at the desired location. Then, the saddle device 11 is positioned on the main pipe 15 such that the locator ring 41 is received by the pipe hole 63 and the inner surface 39 contacts the outside diameter of the pipe 15. The length of the locator ring 41 is sized in accordance with the wall thickness of the main pipe 15 to avoid interfering with the flow inside of the main pipe. The saddle device 11 is oriented on the pipe 15 such that the circumferential edge portions 35 of the coupling portion extend in a circumferential direction on the main pipe and the longitudinal edge portions 37 extend in a longitudinal direction.

If the radius of the main pipe 15 is equal to the normal or unflexed radius of the inner surface 39, then no flexing of the coupling portion 19 is required. Conventional band clamps 65 are located in the respective channels 43 on the circumferential edge portions 35 and around the remaining pipe circumference. The band clamps 65 are tightened to securely retain the coupling portion 19 to the main pipe 15. Then, the end portion of the branch pipe 13 is inserted into the fitting portion counterbore 29 until the pipe end contacts the beveled surface 31. The beveled surface 31 and the reinforced wall of the saddle device assist in supporting the weight of the branch pipe. A conventional band clamp 67 is located in the channel 33 at the outer end of the fitting portion 17 and tightened to both retain the branch pipe in the fitting portion and provide a seal between the branch pipe and the fitting portion. The channels 33, 43 retain the band clamps in their proper locations during installation.

The circumferential edge portions 35 and the longitudinal edge portions 37 provide a seal between the coupling portion 19 and the main pipe 15. With the band clamps 65 tightened, the inner surface 39 immediately beneath the band clamps are forced into sealing engagement with the outside diameter of the main pipe 15 thereby providing a seal along each circumferential edge portion 35. Furthermore, the inner surface 39 beneath the longitudinal edge portions 37 and the lip surfaces 57, 59 are forced into sealing engagement with the outside diameter of the main pipe. The band clamps 65 overlay the flat ends 47 of the stiffeners 45; as the band clamps are tightened, the stiffeners 45, and thus the longitudinal edge portions 37, are forced closer to the pipe to provide the seals.

If the radius of the main pipe 15 is larger than the normal or unflexed radius of the inner surface 39, then the lips 55 are spread apart with respect to each other by flexing the coupling portion 19, and the saddle device 11 is installed on the main pipe as described above.

If the radius of the main pipe 15 is smaller than the normal or unflexed radius of the inner surface 39, then the lips 55 are forced closer together with respect to each other by flexing the coupling portion 19. As the lips 55 are brought closer together, the stiffeners 45 prevent outward bowing of the longitudinal edge portions 37, thereby preventing leaks. To further enhance the seal between the saddle device 11 and the main pipe 15 along the longitudinal edge portions 37, the stiffeners 45 may be bent so that the central portion 49 of each stiffener is positioned closer to the main pipe than are the ends 47. This can be achieved by gripping each longitudinal edge portion 37 with the hands so that the thumbs rest on the outside of the central portion 49 of a stiffener 45 and the fingers of each hand rest on the inside of the respective ends 47 of the stiffener, and pushing with the thumbs while pulling with the fingers. Thus, with the stiffeners bent, the longitudinal edge portions 37 are bowed inwardly (see FIG. 5). The stiffeners 45 will retain the longitudinal edge portions in this bowed configuration until the band clamps 65 are tightened around the circumferential edge portions 35. As the band clamps are tightened, the central portion of each longitudinal edge portion 37 is forced into sealing engagement with the outside diameter of the main pipe, followed by the sealing engagement of the ends of the longitudinal edge portions with the main pipe.

The saddle device can be used in conjunction with various types of pipes including cast iron, steel, schedule 40 plastic pipe, SDR (sewer drain waste) 35 pipe, and clay. If the saddle device is made of flexible PVC and is used in conjunction with PVC pipe, then an adhesive can be used between the saddle device and the pipe. The saddle device has been tested with success on main pipes ranging in diameter from four inches to twelve inches with 10 psi of pressure.

Although the saddle device is shown in a "T" configuration, wherein the branch pipe is perpendicular to the main pipe, the saddle device can be easily made in other configurations such as a "Y", wherein the intersection of the branch and main pipes form an acute angle.

Although the saddle device has been described with stiffeners made of metal strips, other types of stiffeners can be used. Because the saddle device is made of flexible material, the longitudinal edge portions 37 tend to bow outwardly away from the pipe when the coupling portion is flexed to fit on a main pipe having a radius that is smaller than the unflexed radius of the inner surface 39. By using stiffeners made of a material that is stiffer or more rigid than the flexible material of the fitting and coupling portions 17, 19, the stiffeners 45 resist this outward bowing of the longitudinal edge portions 37. Thus, the stiffeners can be lengths of rigid plastic, fiberglass, or other suitable material. One advantage of using a metal strip stiffener is that it can be bowed inwardly to further counteract the tendency of outward bowing, and will retain that shape. Another advantage of a metal stiffener is that it can withstand the high temperatures needed for molding flexible PVC plastics. The stiffeners need not be molded into the longitudinal edge portions, but can be externally located.

Although the saddle device has been described with a lip 55 of a particular shape, other types or shapes of projections from the inner surface 39 can be used. The lips 55, together with the stiffeners 45, provide a seal along each of the longitudinal edge portions 37. Each lip is forced into sealing contact with the outside diameter of the main pipe, instead of bowing outwardly, by the stiffeners, which are clamped at their ends by the band clamps 65.

The foregoing disclosure and the showings made in the drawings are merely illustrative of the principles of the invention and are not to be interpreted in a limiting sense.

I claim:

1. A saddle device for use in tapping into a first pipe with a second pipe, comprising:
    (a) a fitting portion having an outer end and an inner end, said fitting portion having a passage extending between said outer and inner ends, said fitting portion outer end being adapted to receive said second pipe;
    (b) a coupling portion integral to said fitting portion inner end, said coupling portion having an arcuate inner surface for contacting the outside diameter of said first pipe, said inner surface having an opening that communicates with said passage of said fitting portion;
    (c) said coupling portion having a circumferential edge portion on each side of said fitting portion and a connecting edge portion on each side of said fitting portion, said circumferential edge portions having a curvature similar to said inner surface curvature and being adapted to fit around part of the circumference of said first pipe, said circumferential edge portions being adapted to receive means for retaining said saddle device onto said first pipe, said connecting edge portions extending between said circumferential edge portions;
    (d) said saddle device being made of an elastomeric material so as to be flexible, wherein said coupling portion can be flexed so as to both increase or decrease the curvature of said inner surface so that said saddle device can be fitted onto a variety of pipe sizes, said connecting edge portions having respective stiffening means extending between said circumferential edge portions, said stiffening means being made of a material that is stiffer than said elastomeric material so as to inhibit bowing of said connecting edge portions when the curvature of said inner surface is increased.

2. The saddle device of claim 1 wherein each of said connecting edge portions comprises integral lip means projecting from said inner surface so as to contact said first pipe when said saddle device is installed onto said first pipe.

3. The saddle device of claim 2 wherein said inner surface normally is cylindrically curved.

4. The saddle device of claim 2 wherein each of said stiffening means comprises a metal strip imbedded inside of said respective connecting edge portions, said metal strip having a "V" shaped transverse cross-section.

5. The saddle device of claim 3 wherein each of said stiffening means comprises a metal strip imbedded inside of said respective connecting edge portions, said metal strip having a "V" shaped transverse cross-section.

6. The saddle device of claim 1 wherein each of said stiffening means comprises a metal strip.

7. A saddle device for use in tapping into a first pipe with a second pipe, comprising:

(a) a fitting portion having an outer end and an inner end, said fitting portion having a passage extending between said outer and inner ends, said fitting portion outer end being adapted to receive said second pipe;

(b) a coupling portion comprising an arcuate wall means that is integral to said fitting portion inner end, said wall means having an arcuate inner surface adapted to be located on the outside diameter of said first pipe, said passage extending through said inner surface, said wall means having circumferential edge portions located so that said fitting portion is between said circumferential edge portions, said circumferential edge portions being arcuate and being adapted to fit around part of the circumference of said first pipe, said circumferential edge portions being adapted to receive means for retaining said saddle device onto said first pipe;

(c) said wall means having generally straight connecting edge portions extending between said circumferential edge portions, wherein said fitting portion is located between said connecting edge portions;

(d) said saddle device being made of an elastomeric material so as to be flexible, wherein said coupling portion can be flexed so as to both increase or decrease the curvature of said inner surface from an unflexed configuration so that said saddle device can be fitted onto a variety of pipe sizes, said connecting edge portions having respective stiffening means extending between said circumferential edge portions, said stiffening means being made of a material that is stiffer than said elastomeric material so as to inhibit bowing of said connecting edge portions when the curvature of said inner surface is increased.

8. A saddle device for use in tapping into a first pipe with a second pipe, comprising:

(a) a fitting portion having an outer end and an inner end, said fitting portion having a cylindrical passage for receiving an end portion of said second pipe, said cylindrical passage extending between said inner and outer ends, said outer end being adapted to receive means for retaining said second pipe in said fitting portion;

(b) a coupling portion comprising an arcuate wall means that is integral to said fitting portion inner end, said wall means having a cylindrically curved inner surface, said passage extending through said inner surface, said wall means having circumferential edge portions located so that said fitting portion is between said circumferential edge portions, said circumferential edge portions being arcuate and being adapted to receive means for retaining said saddle device onto said first pipe, said circumferential edge portions being adapted to fit around part of the circumference of said first pipe;

(c) said wall means having longitudinal edge portions extending between said circumferential edge portions, said longitudinal edge portions being adapted to extend in a generally longitudinal direction along said first pipe when said saddle device is located on said first pipe;

(d) said saddle device being made of an elastomeric material so as to be flexible, wherein said coupling portion can be flexed so as to both increase or decrease the radius of said inner surface so that said saddle device can be fitted onto a variety of pipe sizes;

(e) said longitudinal edge portions each having stiffening means extending between said circumferential edge portions, said stiffening means being made of a material that is stiffer than said elastomeric material so as to prevent flexing of said longitudinal edge portions when the radius of said inner surface is decreased;

(f) each of said longitudinal edge portions comprises integral lip means projecting from said inner surface so as to contact said first pipe when said saddle device is installed on said first pipe.

9. The saddle device of claim 8 wherein each of said stiffening means comprises a metal strip.

10. The saddle device of claim 8 wherein each of said stiffening means comprises a metal strip imbedded inside of said respective connecting edge portions, said metal strip having a "V" shaped transverse cross-section.

11. The saddle device of claim 10 wherein each of said lip means comprises first and second surfaces, with said first and second surfaces being planar and perpendicular to each other, said first surface merging with said inner surface at an obtuse angle.

12. The saddle device of claim 11 further comprising a locator ring around the inner end of said passage for locating an opening in said first pipe.

13. The saddle device of claim 12 wherein said passage has a reduced diameter near said fitting portion inner end to aid in supporting said second pipe.

14. The saddle device of claim 13 wherein said fitting portion has a channel for receiving said means for retaining said second pipe and said circumferential edge portions have channels for receiving said means for retaining said saddle device onto said first pipe.

15. The saddle device of claim 8 wherein each of said lip means comprises first and second surfaces, with said first and second surfaces being planar and perpendicular to each other, said first surface merging with said inner surface at an obtuse angle.

16. The saddle device of claim 15 wherein each of said stiffening means comprises a metal strip.

17. The saddle device of claim 8, further comprising;
(a) a locator ring around the inner end of said passage for locating an opening in said first pipe;
(b) said passage has a reduced diameter near said fitting portion inner end to aid in supporting said second pipe;
(c) said fitting portion has a channel for receiving said means for retaining said second pipe and said circumferential edge portions have channels for receiving said means for retaining said saddle device onto said first pipe.

18. The saddle device of claim 7, wherein:
each of said stiffening means comprises a generally straight member, embedded in each of said connecting edge portions respectively.

19. The saddle device of claim 18, wherein:
each of said stiffening means comprises a bendable member.

20. The saddle device of claim 19, wherein:
each of said stiffening means comprises a metal member.

* * * * *